(12) United States Patent
Lai

(10) Patent No.: US 7,520,492 B1
(45) Date of Patent: Apr. 21, 2009

(54) JOINT STRUCTURE OF A HANDRAIL

(76) Inventor: Ming-Hsiao Lai, No. 8, Kung Chi 2 Lane, Kung Chi Village, Ta Tsuen Hsiang, Chang-Hua Hsien (TW)

( * ) Notice: Subject to any disclaimer, the term of this patent is extended or adjusted under 35 U.S.C. 154(b) by 0 days.

(21) Appl. No.: 11/617,617

(22) Filed: Dec. 28, 2006

(51) Int. Cl.
*E04H 17/00* (2006.01)
(52) U.S. Cl. .................... 256/65.05; 403/199; 403/336; 403/337; 16/436; 256/65.04; 256/65.16
(58) Field of Classification Search ............ 256/59, 256/65.02, 65.03, 65.04, 65.05, 65.06, 65.14, 256/65.16; 403/235, 236, 192, 199, 335, 403/336, 337; 52/174, 184, 297; 16/436, 16/444, 446
See application file for complete search history.

(56) References Cited

U.S. PATENT DOCUMENTS 2,215,331 A * 9/1940 Marsh ........................ 248/251
2,905,126 A * 9/1959 Gaffey ..................... 256/65.02
3,193,228 A * 7/1965 Chion ......................... 256/59
4,209,099 A * 6/1980 Wickes ....................... 211/182
5,143,472 A * 9/1992 Reed et al. .................... 256/59
5,193,786 A * 3/1993 Guenther ................. 256/65.16
5,894,610 A * 4/1999 Winter ....................... 403/263
6,948,704 B2 * 9/2005 Forbis et al. ............. 256/65.08

* cited by examiner

*Primary Examiner*—Michael P Ferguson
(74) *Attorney, Agent, or Firm*—Egbert Law Offices PLLC

(57) ABSTRACT

A handrail joint assembly has a mounting disc and plug-in portion. The plug-in portion is fitted with pin holes that align with the through-hole for threading of the pin. A ring cover is externally placed onto the mounting disc. The plug-in portion is formed by the extended and folded flange of the joint, which has an internal flange, an external flange and a terminal flange, such that the pin hole of plug-in portion can penetrate the internal and external flanges. The joint is fabricated from stainless steel.

4 Claims, 6 Drawing Sheets

JOINT STRUCTURE OF A HANDRAIL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a joint structure of a handrail, and more particularly to an innovative handrail with a coupling tube at the joint.

2. Description of Related Art Including Information Disclosed Under 37 CFR 1.97 and 37 CFR 1.98

The existing handrail is assembled and fixed onto the wall via its joint. Since the external diameter of the joint is much bigger than the handrail, the joint is individually fabricated and then combined with the handrail. For this reason, the present invention is intended to improve this coupling joint of the handrail.

The disadvantages of typical prior art structures are detailed in the first prior art structure as shown in FIG. 1, wherein the joint 11 and handrail 12 are soldered with soldering flux 13. However, it is found from the applications that, uneven bead and local shelling of soldering flux likely occur during the soldering process, leading to lower yield and higher cost as well as a time-consuming manufacturing process.

Another disadvantage is shown in the second prior art structure shown in FIG. 2, wherein the joint 21 and handrail 22 are fastened securely by means of screwing. In other words, a screw section 23 is placed at the end of the handrail 22, and a bolt hole 24 set at the center of the joint 21. So, the screw section 23 is screwed into the bolt hole 24 for fastening of the joint 21 and handrail 22. However, it is found that the handrail 22 is made from a pipe with a wall depth only about 1-1.5 mm. So, the thinner screw section 23 will offer an excessively small bonding force of the joint 21 and handrail 22, leading to poorer strength and degraded durability in the application.

Still another disadvantage is shown in the third prior art structure shown in FIG. 3, wherein the joint 31 and handrail 32 are fastened by pin connection. The joint 31 is die-cast from aluminum zinc alloys, and a protruding tube 33 is set at the center of joint 31 for mating with the end 34 of the handrail 32. Two radial through-holes 35, 36 are placed in opposition on the protruding tube 33 and end 34 of the handrail 32, allowing insertion of a pin 37 for a positioning purpose. However, it is found that the handrail 32 is commonly used in a bathroom or toilet, where it is exposed to moisture or cleaning agents with acid corrosion. In such a case, the joint 31 die-cast by aluminum zinc alloys likely generates oxidation and corrosion, leading to loss of structural strength and lower service life. The protruding tube 33 of joint 31 must be thick enough (approx. 3 mm) to support securely the pin. Given the fact that die-cast protruding tube 33 has a solid wall, this design is not perfectly suitable for mass production due to much higher costs, which are disfavored manufacturers.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The enhanced efficacy of the present invention is based upon an innovative plug-in portion 42 which is formed by the extended/folded flange of the joint 40, and comprised of an internal/external flange and a terminal flange. The present invention, as compared with prior art structures, permits the joint 40 to be fabricated from stainless steel of high strength, thus forming a double-layer plug-in portion 42 comprising internal and external flanges 421, 422. So, a snapping portion could be shaped from a single sheet to provide strong support to the pin 60, thereby offering optimum structural strength with minimum material cost, and achieving desired practicability and cost-effectiveness for the industry.

The improvements brought about by this invention are as follows:

1. With another technical feature that the internal and external flange 421, 422 of the plug-in portion 42 are arranged at intervals, it shall be possible to increase the snapping and positioning stroke of the stress portion of the pin 60, thus saving the material cost and improving the practicability.

2. The positioning flanges 45 are arranged around the mounting disc 41 such that a positioning concave 71 is set at an inner wall of the ring cover 70 for a coupling purpose. When the ring cover 70 is assembled onto the mounting disc 41, the coupling of positioning flange 45 and positioning concave 71 obtain a desirable positioning effect.

3. The joint 40 and handrail 50 of the present invention is separately fabricated and then combined. The joint 40 and handrail 50 allow for different surface treatments into various colors and quality, thus meeting the diversified customer demands with two-colored, high-quality handrails. Typical prior art joint structures and handrails are delivered in a one-color effect in the case of soldering.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
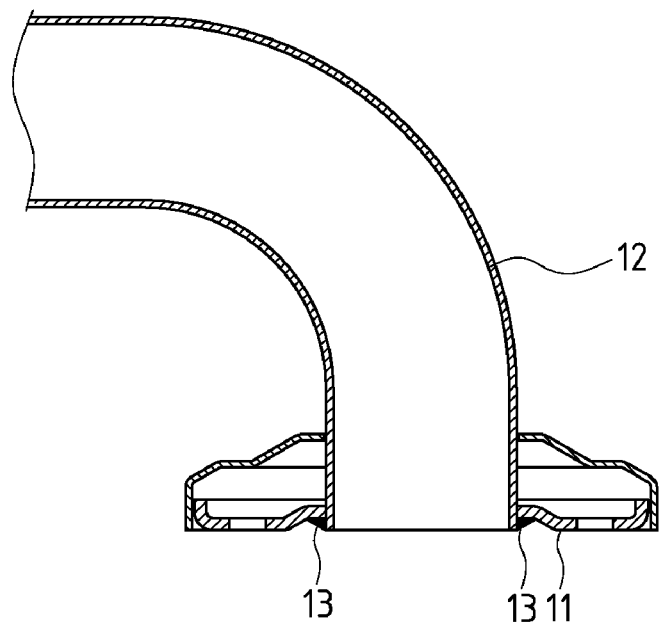
FIG. 1 shows a sectional view of a first prior art structure.
Figure 2:
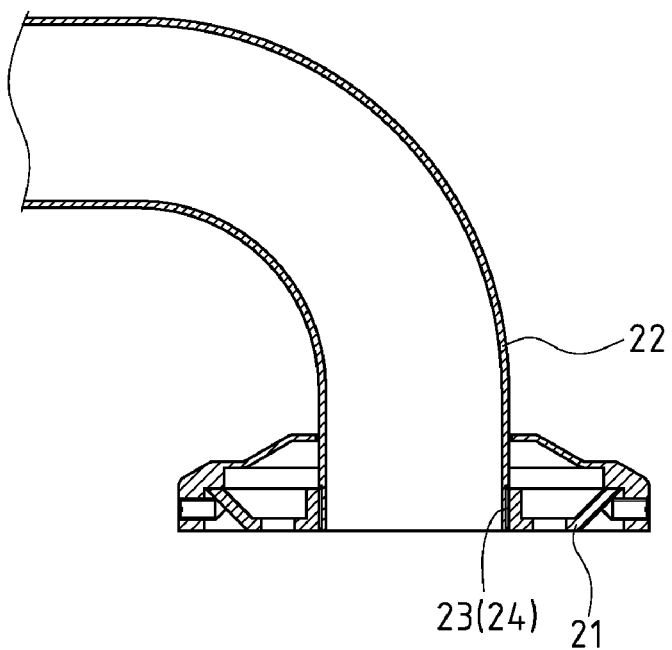
FIG. 2 shows a sectional view of a second prior art structure.
Figure 3:
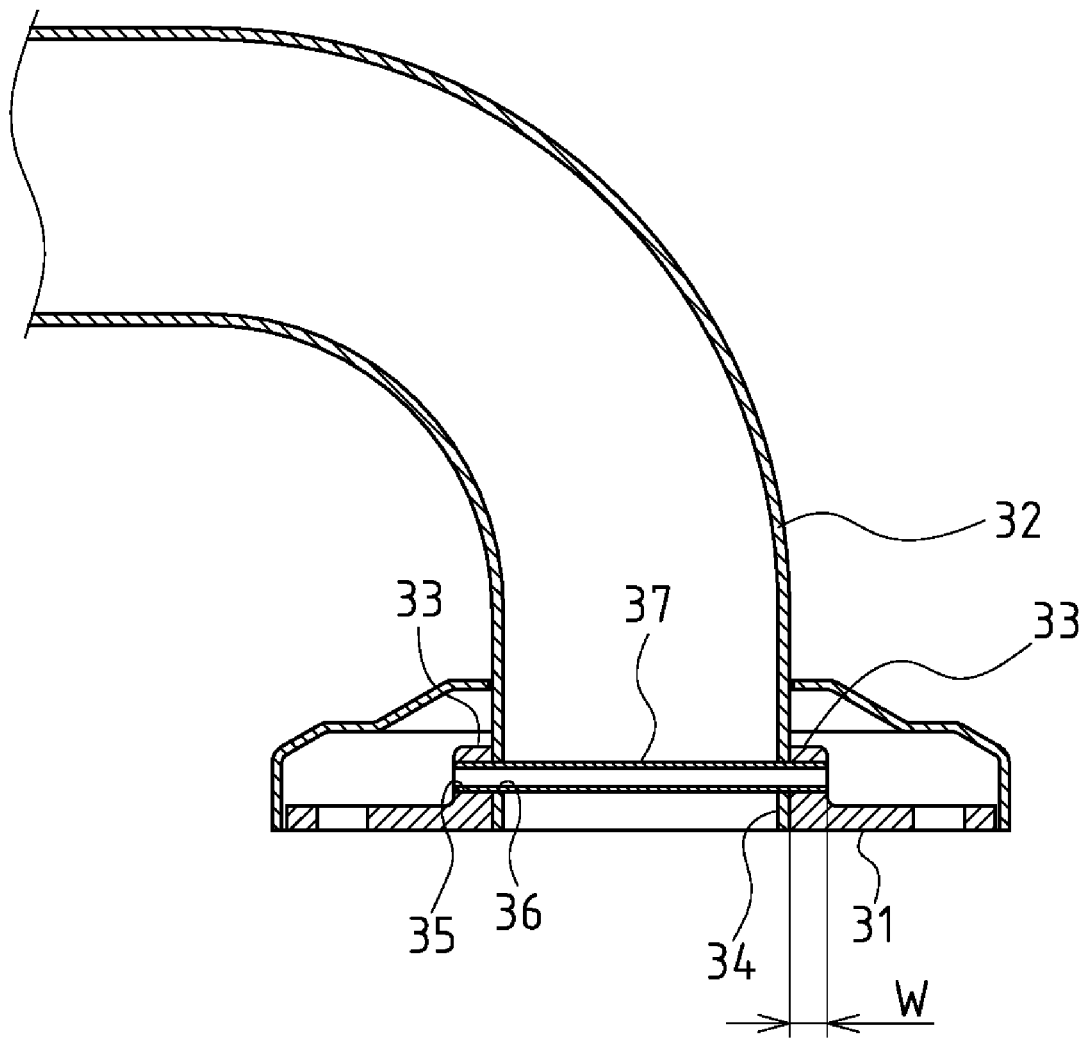
FIG. 3 shows a sectional view of a third prior art structure.
Figure 4:
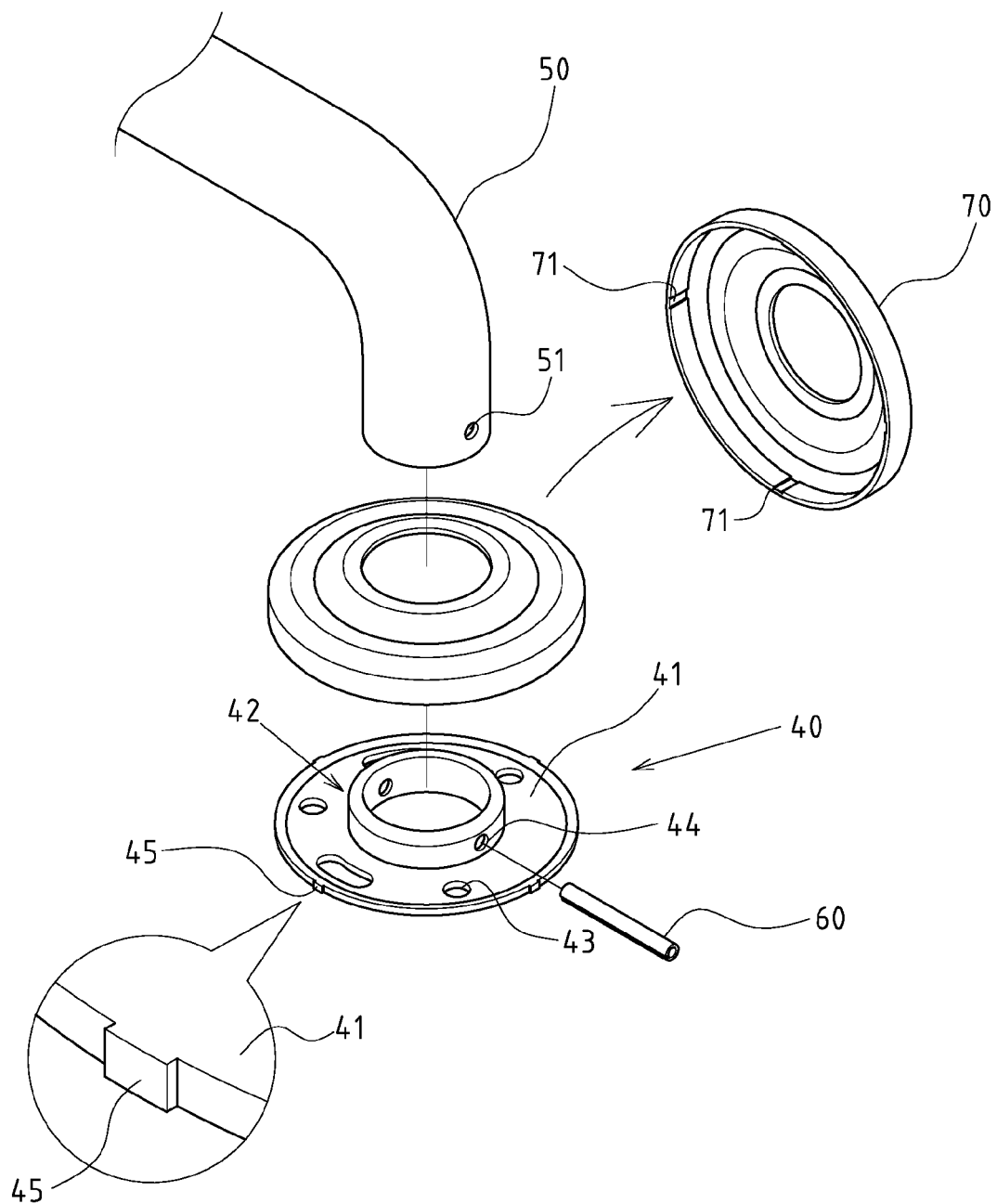
FIG. 4 shows an exploded perspective view of the preferred embodiment of the present invention.
Figure 5:
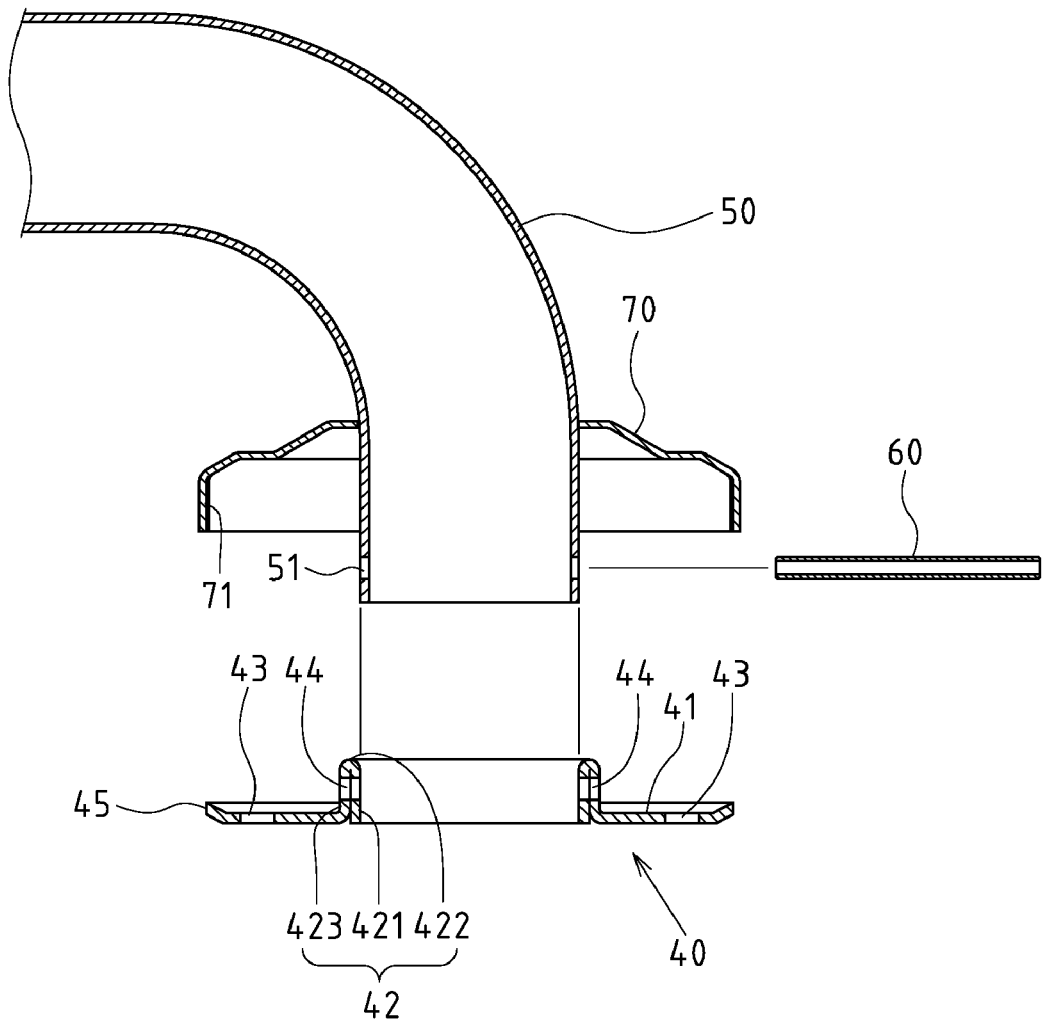
FIG. 5 shows an exploded sectional view of the preferred embodiment of the present invention.
Figure 6:
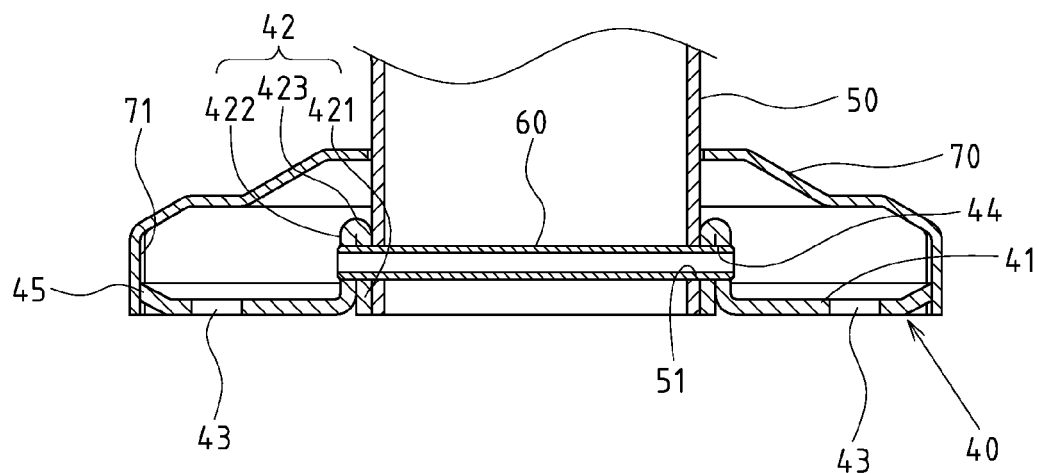
FIG. 6 shows an assembled sectional view of the preferred embodiment of the present invention.

FIGS. 4, 5 and 6 depict preferred embodiments of the improved joint structure of a handrail of the present invention, which are provided only for explanatory purposes. The joint 40 comprises a hollow mounting disc 41 and centrally protruding plug-in portion 42. The mounting disc 41 comprises mounting holes 43, while the plug-in portion 42 is fitted with radially-penetrated pin holes 44 that align with the through-hole 51 of the handrail 50 for threading of the pin 60. A ring cover 70 is externally placed onto the mounting disc 41

The plug-in portion 42, formed by the extended and folded flange of the joint 40, comprises at least an internal flange 421, an external flange 422 and a terminal flange 423 between internal and external flange 421, 422 (shown in FIGS. 5, 6), which enable pin hole 44 of the plug-in portion 42 to penetrate the internal and external flange 421, 422.

The joint 40 is made of stainless steel, while the internal and external flange 421, 422 and terminal flange 423 are die-cast.

Referring to FIGS. 5, and 6, the internal and external flange 421, 422 of the plug-in portion 42 can be closely mated.

Figure 7:
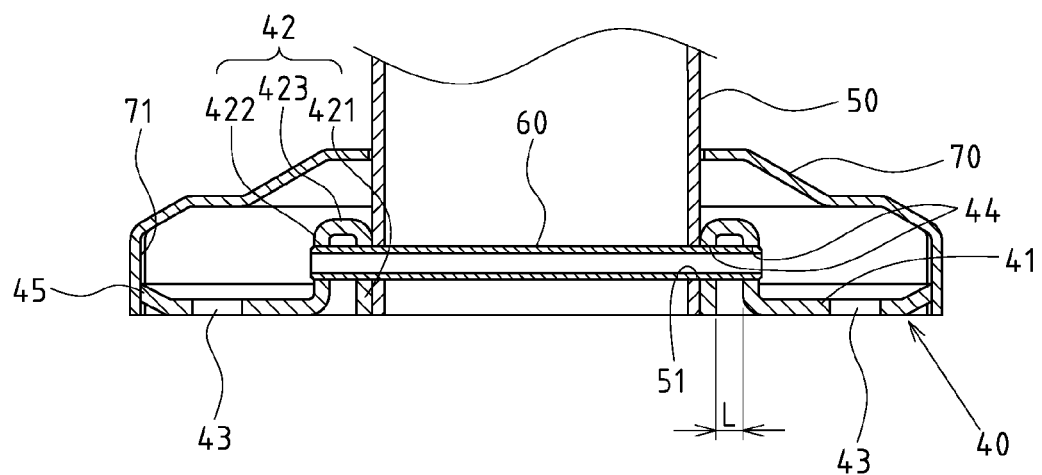
FIG. 7 shows another sectional view of application of the plug-in portion of the present invention.

Referring to FIG. 7, the internal and external flange 421, 422 of the plug-in portion 42 can also be arranged at intervals. So, it shall be possible to increase the snapping and positioning stroke of the stress portion of the pin 60, without leading to higher material cost. Only the width of terminal flange 423 increases slightly.

Positioning flanges 45 are arranged at intervals around the mounting disc 41 such that a positioning concave 71 is set at inner wall of the ring cover 70 for a coupling purpose. When the ring cover 70 is assembled onto the mounting disc 41, the coupling of positioning flange 45 and positioning concave 71 obtain a desirable positioning effect.

Figure 8:
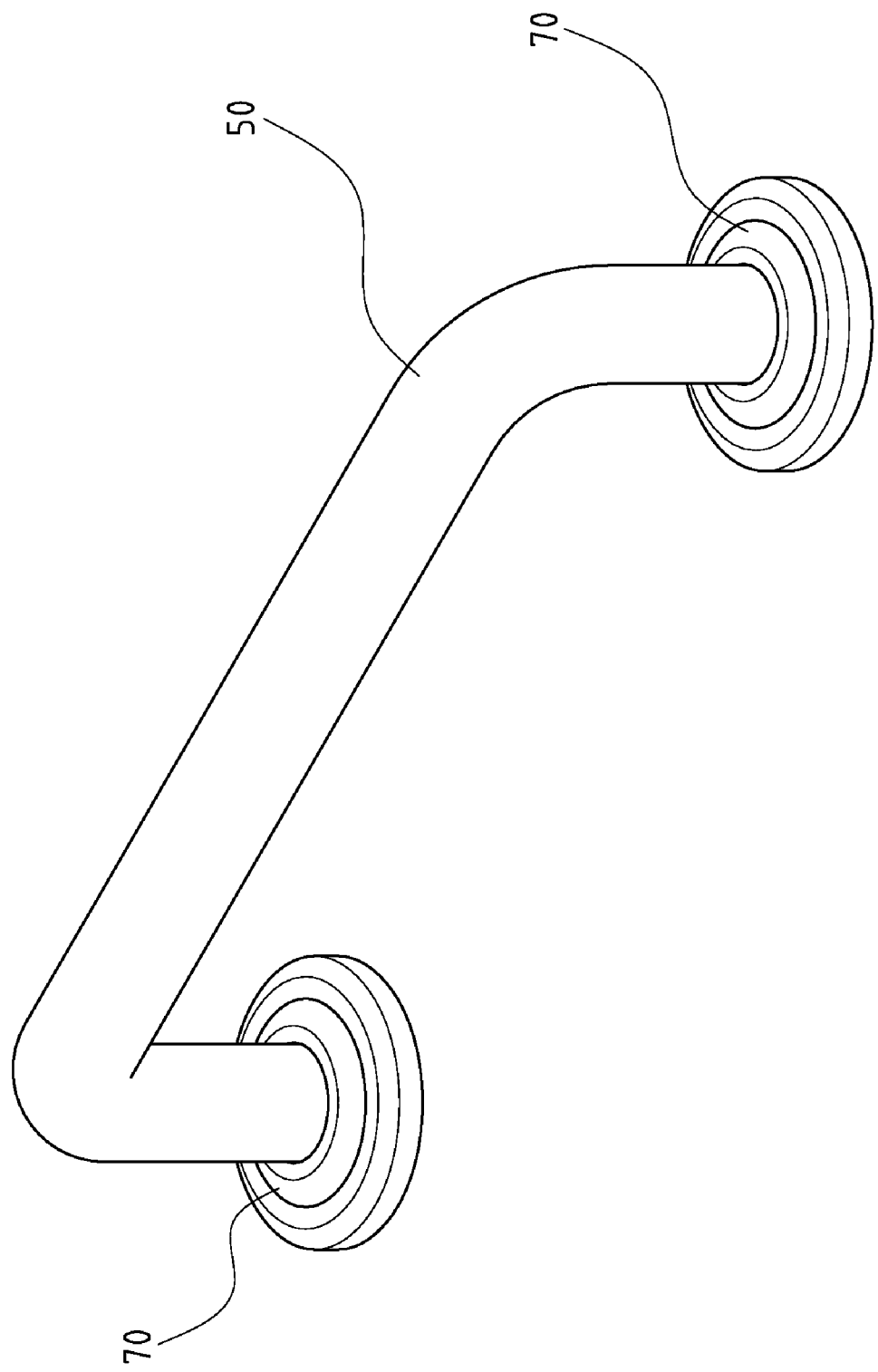
FIG. 8 shows a perspective view of the assembly of entire handrail structure of the present invention.

Based upon above-specified structural design, when the joint 40 and handrail 50 of the present invention are assembled, the ring cover 70 shall be screwed into the end of handrail 50, as shown in FIGS. 5, 6. Then, the end of handrail 50 is inserted into the plug-in portion 42 of the joint 40, such that the pin hole 44 aligns with through-hole 51 of the handrail 50, enabling threading of the pin 60 and positioning of the handrail 50 and joint 40. The joint 40 is fastened onto the preset wall, and then the ring cover 70 is laid over the mounting disc 41 of the joint 40, thus enabling assembly of one end of handrail 50 onto the joint 40. The other end of the handrail 50 could be assembled onto another joint 40 in the same way. FIG. 8 depicts the overall assembly state of the handrail 50, where the handrail 50 of the preferred embodiment is fabricated into a π-shaped handrail for bathroom/toilet applications.

I claim:

1. An apparatus comprising:

a hollow mounting disc having a generally planar annular surface and an annular centrally protruding portion integrally formed therewith and extending outwardly of said annular surface, said mounting disc having a plurality of mounting holes formed therein, said centrally protruding portion having radially extending pin holes formed therethrough, said centrally protruding portion being formed by a folded flange, said folded flange having an internal flange and an external flange and a terminal flange integrally connected together, said terminal flange positioned between said internal flange and said external flange, said terminal flange formed at an end of said internal flange and at an end of said external flange opposite said annular surface, said pin holes extending through said internal flange and said external flange;

a handrail having an end received in said centrally protruding portion, said handrail having a through hole formed adjacent an end thereof, said through hole being aligned with said pin holes of said centrally protruding portion, said end of said handrail having an external surface residing in surface-to-surface contact with an interior surface of said internal flange;

a pin extending through said pin holes and said through hole so as to join said end of said handrail to said mounting disc to cover said plurality of mounting holes, said mounting disc having a positioning flange extending radially outwardly therefrom, said ring cover having a positioning concave formed in an inner wall thereof, said positioning flange engaged in said positioning concave; and a ring cover affixed around said end of said handrail and over said mounting disc.

2. The apparatus of claim 1, said mounting disc being formed of stainless steel material.

3. The apparatus of claim 1, said internal and external flanges being juxtaposed against each other.

4. The apparatus of claim 1, and internal flange being in spaced parallel relation to said external flange.

* * * * *